United States Patent
Holland

(12)
(10) Patent No.: US 6,519,026 B1
(45) Date of Patent: Feb. 11, 2003

(54) OPTICAL TIME-DOMAIN REFLECTOMETER (OTDR)

(75) Inventor: William R. Holland, Warrington, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/369,915

(22) Filed: Aug. 6, 1999

(51) Int. Cl.[7] ............................................... G01N 21/00
(52) U.S. Cl. ..................................................... 356/73.1
(58) Field of Search .......................... 356/73.1; 385/24, 385/37, 12; 359/110, 334, 124, 133, 134, 151, 160, 174, 176, 337

(56) References Cited

U.S. PATENT DOCUMENTS

| | | |
|---|---|---|
| 4,794,249 A | 12/1988 | Beckmann et al. |
| 5,077,729 A * | 12/1991 | Wong |
| 5,343,286 A | 8/1994 | Keeble et al. |
| 5,452,071 A | 9/1995 | Takeuchi |
| 5,491,574 A * | 2/1996 | Shipley |
| 5,534,994 A | 7/1996 | Hanson et al. |
| 5,767,956 A | 6/1998 | Yoshida |
| 5,777,727 A | 7/1998 | Sato et al. |
| 6,009,220 A * | 12/1999 | Chan et al. |
| 6,088,152 A * | 7/2000 | Berger et al. ................ 359/334 |

FOREIGN PATENT DOCUMENTS

JP        P2000-277834 A   *  3/1999

* cited by examiner

Primary Examiner—Frank G. Font
Assistant Examiner—Tu T. Nguyen
(74) Attorney, Agent, or Firm—Law Offices of John De La Rosa

(57) ABSTRACT

The present invention is directed to an optical time-domain reflectometer which employs a so-called "out-of-band" offsetting to cancel the effects of Raman non-linearities which extract energy from the traffic signal wavelengths and amplify the test signal back-scattering. Losses and faults in the optical fibers are monitored by measuring the back-scattered portion of the light launched into the fiber, with the test signal back-scattering judiciously offset to account for the Raman non-linearities. That is, the effects of the Raman non-linearities are taken as a baseline measurement and, then accordingly used as a basis to offset the test signal back-scattering.

24 Claims, 3 Drawing Sheets

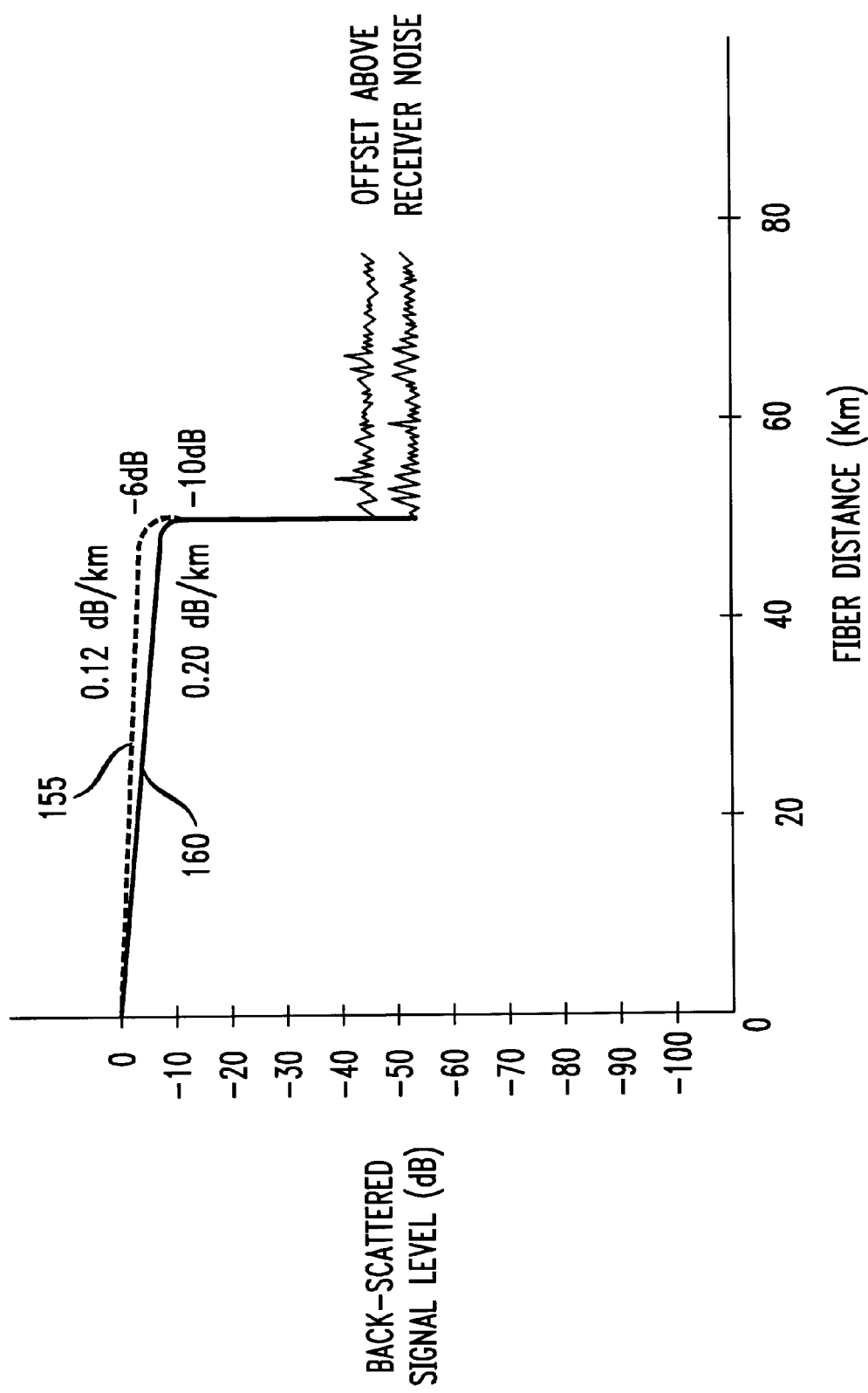

OPTICAL TIME-DOMAIN REFLECTOMETER (OTDR)

TECHNICAL FIELD

The present invention relates to an optical time-domain reflectometer (OTDR) for detecting and monitoring losses and faults in optical fibers employed, for example, in a dense wavelength division multiplexing (DWDM) communication system.

BACKGROUND OF THE INVENTION

Long distance communication systems are upgrading to the use of dense wavelength division multiplexing (DWDM), allowing optical channels to be spaced a few nanometers or less. Although greatly increasing transmission capacity, as these changes are made, significantly more capacity and investment are placed on a single optical fiber, warranting continuous monitoring for losses or faults in the fiber, such as through remote testing.

It is well known in the art, however, that an optical time-domain reflectometer (OTDR) can be used to locate faults, or to measure transmission loss in an optical fiber. More specifically, an OTDR launches a test pulse of light into the optical fiber, and then monitors the back-scattered light for changes in intensity, indicative of a loss or fault.

To ensure reliable fault coverage, active fiber OTDR testing is currently being deployed on DWDM communication systems to monitor for losses and faults. Unfortunately, it has not been recognized that the current OTDR method is generally ill-suited for DWDM communication systems.

SUMMARY OF THE INVENTION

In accordance with the principles of invention, an optical time-domain reflectometer (OTDR) employs a so-called "out-of-band" offsetting to cancel the effects of Raman non-linearities which extract energy from the traffic signal wavelengths and amplify the test signal back-scattering, thereby corrupting the ODTR measurement. Losses and faults in the optical fibers are monitored by measuring the back-scattered portion of the light launched into the fiber, but the test signal back-scattering is judiciously offset to account for Raman non-linearities. That is, the effects of the Raman non-linearities are taken as a baseline measurement and, then accordingly used as the basis to offset the back-scattered signal.

This latter "out-of-band" offsetting is accomplished by first measuring the "out-of-band" back-scattering without the presence of a test signal, but while there is still live traffic. More specifically, just prior to launching a test light pulse, the OTDR first measures the "out-of-band" back-scattering due to the Raman non-linearities, that is the amount of back-scattering reaching the ODTR that occurs at the test signal wavelength due to stimulated Raman scattering. This "out-of-band" back-scattering is measured by generating a "blank" test pulse, and then measuring the backward-scattering occurring at the test wavelength.

Once the "out-of-band" or baseline back-scattering has been obtained, the OTDR launches a short duration test light pulse(s) into the optical fiber, and measures as a function of time the test signal back-scattering, which is the sum of the back-scattering due to Rayleigh scattering and possibly Fresnel reflections, but amplified due to the Raman gain, G. Importantly, the previously measured "out-of-band" or baseline back-scattering occurring at the test signal wavelength is used to calculate the Raman gain, G, which in turn is used as the basis to offset the test signal back-scattering, thereby canceling the effects of the Raman non-linearities.

BRIEF DESCRIPTION OF THE DRAWINGS

The features and advantages of the present invention will become more readily apparent from the following detailed description of the invention in which like elements are labeled similarly and in which:

FIG. 4 depicts exemplary OTDR traces with and without the effects of Raman non-linearities useful in illustrating the principles of the present invention.

DETAILED DESCRIPTION

It has been discovered that current OTDRs are generally ill-suited for monitoring losses and faults in optical fibers employed in DWDM communication systems due to the effects of Raman non-linearities, specifically stimulated Raman scattering and Raman gain. When both live traffic and test signal wavelengths are present, particularly at high power levels, power from the traffic signal wavelengths can readily be transferred into the back-scattered signal. As well as generating new frequencies, the strong traffic signal wavelength also provides significant optical gain for the back-scattered signal. As described herein below, the present inventive optical time-domain reflectometer (OTDR), however, employs a so-called "out-of-band" offsetting for canceling the effects of Raman non-linearities.

Without any loss of generality or applicability for the principles of the invention, the preferred embodiment of the OTDR is described with respect to a DWDM communication system. It should be clearly understood, however, that the present invention is equally applicable to lightwave communication systems employing spare or simple WDM, but of sufficiently high power levels, to have Raman non-linearities cause energy to be extracted from the traffic signal so as to amplify the back-scattered signal.

Figure 1:
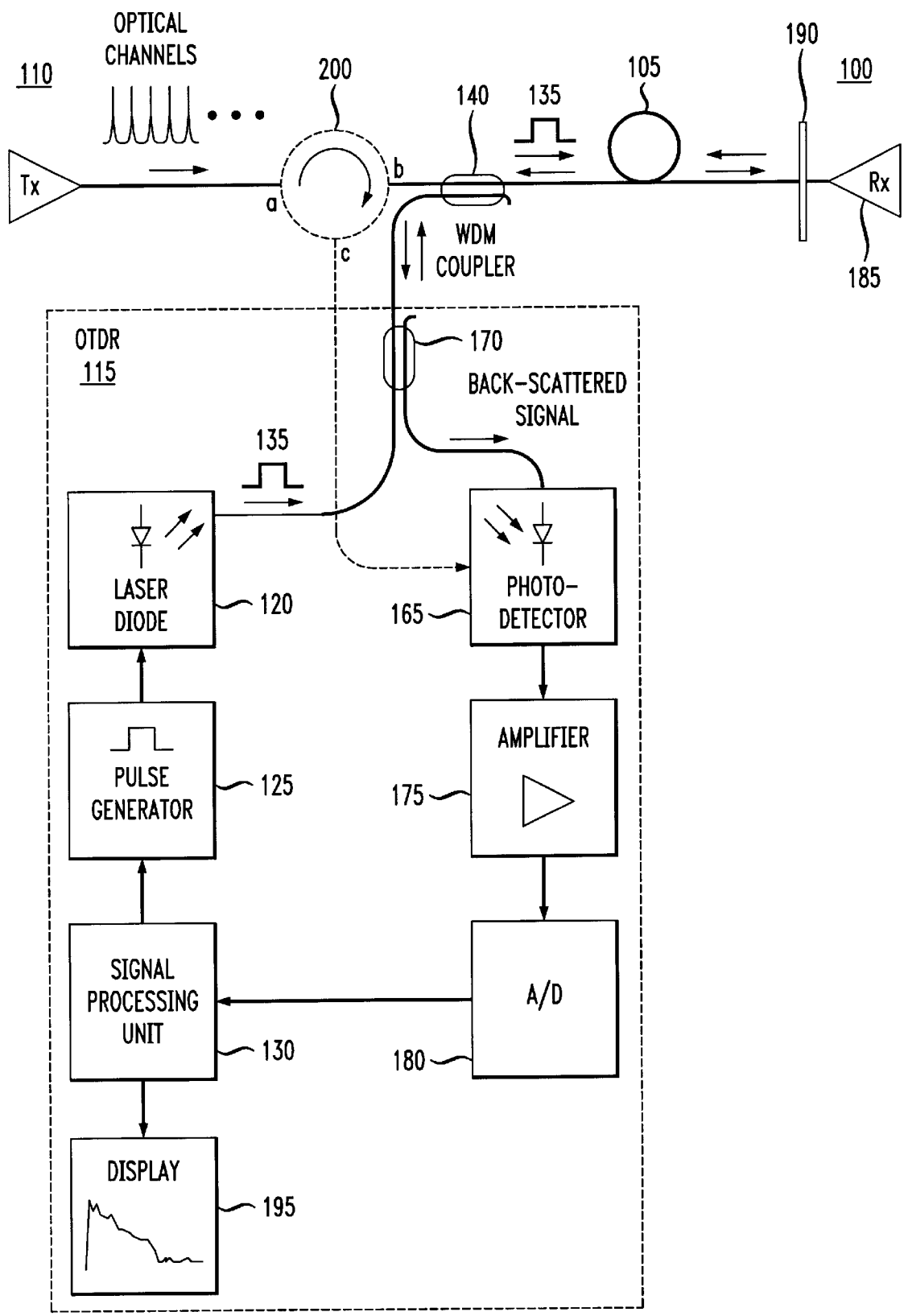
FIG. 1 is a block diagram of an OTDR measurement system modified to account for the effects of Raman non-linearities in accordance with principles of the invention as applied to a DWDM communication system.

Shown in FIG. 1 is an exemplary dense wavelength division multiplexed (DWDM) communication system 100 in which an optical transmission fiber 105 carries the desired optical signals over a plurality of independent optical channels 110, spaced, for example, 100 GHz (0.8 nm) apart. Each of the optical channels is allocated a unique band of wavelengths to transmit information over optical fiber 105 using well-known modulation techniques, preferably in the commonly used 1.55 $\mu$m region, where the attenuation is the lowest. In practice, the optical channels are generated by a plurality of transmission lasers and, then multiplexed onto optical fiber 105 using a fiber coupler. Although not shown, DWDM communication system 100 preferably also employs Erbium (Er) doped fiber amplifiers to maintain the amplitude and integrity of the optical signals over substantially the entire span of optical fiber 105.

Shown in FIG. 1 is also an optical time-domain reflectometer (OTDR) 115, which has become the primary instrument in the prior art for the characterization of optical fibers based on back-scattered measurements. OTDR 115 comprises a laser diode 120 which is intensity modulated by a pulse generator 125 upon being triggered by a signal-processing unit 130. Although various codes and correlation techniques are used, square test light pulses are sufficient for most applications. Typically, pulse widths between 5 ns and 10 μs are used, depending on the desired spatial resolution and sensitivity.

In operation, OTDR 115 launches a short duration light pulse(s) 135 coupled into optical fiber 105 through a WDM coupler 140, and then measures, as a function of time after the launch, the optical signal returned to the ODTR, hereinafter referred to as the "test signal back-scattering" or "test signal back-scatter." As light pulse(s) 135 propagate along optical fiber 105, it encounters reflecting and scattering sites, resulting in a portion of the launched signal being reflected back along in the opposite direction, caused, for example, by Rayleigh scattering and possibly Fresnel reflections. By measuring the arrival time of the test signal back-scattering, the fiber attenuation can be determined, as well as the locations and magnitudes of faults in the fiber, such as splices, cracks and bends. Because the back-scattered signal is typically weak, the measurement is repeated several times to average hundreds to thousands of measurements, improving the signal-to-noise ratio (SNR). Typically, the receiver noise which limits the detectable back-scattered power level is about 100 dB below the launch power level of the test light pulse, but may be improved up to 25–30 dB or more with several minutes of averaging.

Although the conventional OTDR can readily monitor losses and faults, it is ill-suited for optical fibers employed in DWDM communication systems. For 1550 nm traffic signal wavelengths, the 1625–1650 nm spectrum has been established as the standard OTDR test wavelengths due to the absence of traffic, as well as being more sensitive to the physical characteristics of the fiber. It has been inventively recognized, however, that when both live traffic and test signal wavelengths are present, power from the traffic signal wavelengths are readily transferred into the test signal wavelength due to stimulated Raman scattering. This is particularly true at the high power levels employed by DWDM communication (1–5 mW per channel), which for next generation systems will employ 80 or more optical channels.

Raman scattering is caused by the molecular vibrations of optical phonons caused, in this case, by the interaction of the strong electrical fields of the traffic wavelengths and the quartz molecules of optical fiber 105. These molecular vibrations modulate the traffic signals, extracting some of their power into newly generated optical wavelengths, known as Stoke or Anti-Stoke lines. It has been observed that at room temperature, the majority of these newly generated wavelengths are on the higher wavelength side of the traffic signal wavelengths. As well as generating new frequencies, this same molecular vibration provides optical gain for the newly generated light as well as the test signal back-scattering.

Figure 2:
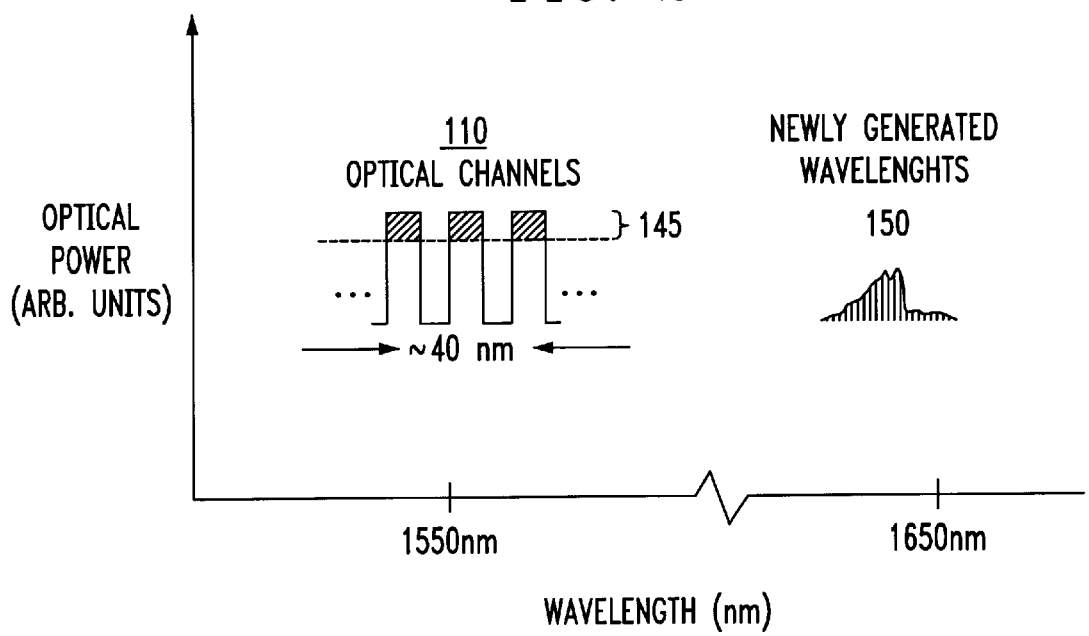
FIG. 2 depicts the transfer of optical power from the traffic signal wavelengths to newly generated wavelengths due to stimulated Raman scattering.

As depicted in FIG. 2, a portion of the optical power within optical channels 110 (shaded region 145) is lost to these newly generated wavelengths 150, reducing the traffic signal level, as well as providing optical gain for the back-scattered signal. For silica, the peak of these newly generated wavelengths 150 occurs about 0.1 μm away from the 1.55 μm traffic signal wavelength, or around 1.65 μm. Initially, these newly generated wavelengths start out as spontaneous Raman light and propagate down the fiber, suffering both fiber loss and experiencing Raman gain. Computer simulations, indicate, that these newly generated wavelengths are typically below the signal level of the test signal back-scattering. For example, about −14 dBm of 20 dBm of 1550 nm traffic will be generated in a 50 km length of fiber, which is about 34 dBm below the traffic power level.

Figure 3:
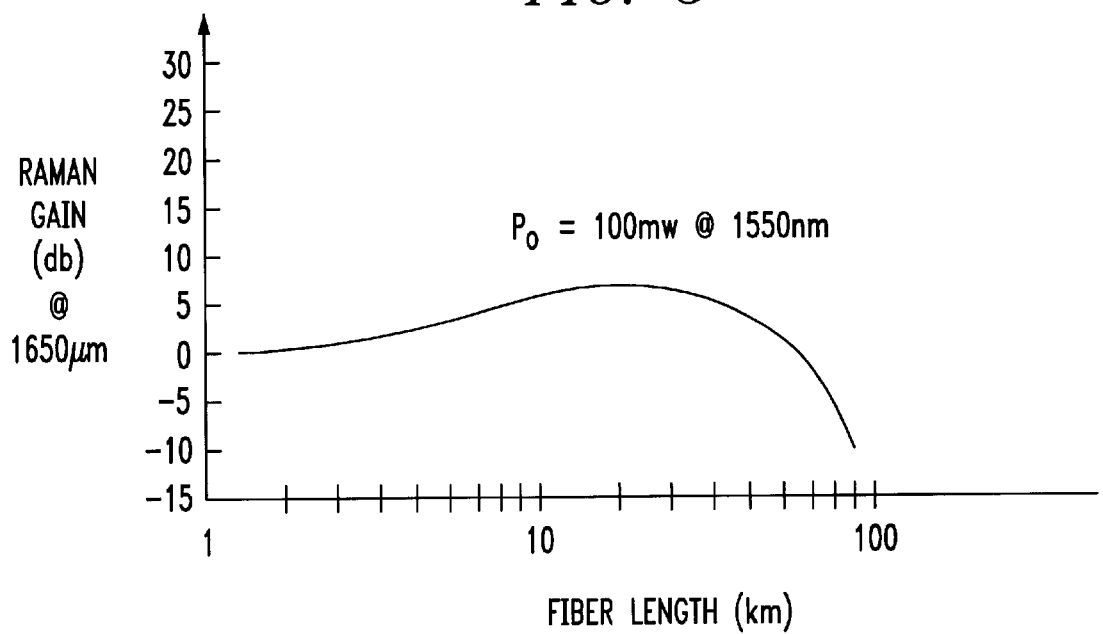
FIG. 3 depicts an exemplary plot of the Raman gain as a function of fiber length.

As noted above, the strong traffic signal wavelengths provide optical gain for the back-scattered signal at the nearby test signal wavelengths of 1625–1650 nm. Shown in FIG. 3 is an exemplary depiction of the Raman gain (dB) as a function of the length of fiber (km). In this particular case, the Raman gain ranges about a few dB for fiber up to 100 km in length. As such, the traffic signal will provide substantial optical gain for the test signal back-scattering over the entire span of the fiber, corrupting the OTDR measurement and thereby severely limiting its accuracy.

Shown in FIG. 4 are exemplary OTDR traces 155 and 160 of the back-scattered signals, with and without the effects of stimulated Raman scattering, respectively. The vertical axis represents the signal level of the test signal back-scattering on a logarithmic scale (dB). The horizontal axis, however, corresponds to the location along optical fiber 105, with the time base translated to distance using a conversion factor of about 10 μs per kilometer (km). Inasmuch as the light travels forward and backward to the OTDR, thereby experiencing twice the fiber attenuation, both axes are scaled by a factor of two.

More specifically, OTDR trace 160 depicts a test light pulse launched at 0 dB which decays to a −10 dB level after 50 km, with its slope representing the attenuation coefficient, α, of 0.05/km or 0.2 dB/km. Taking the fiber attenuation into account, the back-scattered signal weakens with increasing distance, and eventually drops to receiver noise at the end of the fiber.

As discussed herein above, due to Raman non-linearities, the signal traffic, herein at 1550 nm, provides significant optical gain for the test signal back-scattering. Assuming that the Raman non-linearities are small, the optical gain G over a length L of fiber is given by:

$$G = e^{\gamma' L} \tag{1}$$

$$\gamma' = \frac{g L_{eff} P_o}{L A_{eff}} \tag{2}$$

$$L_{eff} = \frac{1}{\alpha}(1 - e^{-\alpha L}) \tag{3}$$

where α is the attenuation coefficient (1/km) of the fiber, γ' is the effective Raman gain coefficient (1/km), g is the Raman gain factor, $P_o$ is the average traffic signal power (W), $A_{eff}$ is the effective core area of the fiber (m²), and $L_{eff}$ is the effective length of the fiber (km).

As such, the Raman gain amplifies the test signal back-scattering and hence offsets OTDR trace 160, erroneously indicating the signal levels of the back-scattered light. The fiber attenuation, among other things, which is based on a back-scattered signal analysis is likewise inaccurate, severely limiting automated testing wherein the attenuation is periodically compared to a reference value. For example, for a length of fiber of 50 km, 100 mW (20 dBm) of traffic signal at 1550 nm would amplify and offset the test signal back-scattering about 4 dB over the length of the fiber, as depicted in OTDR trace 155. Note that due to the Raman gain, the signal level at the fiber end point is only 6 dB lower than the launch level, rather than at the correct level of −10 dB. Hence, ODTR trace 155 has a much lower slope, erroneously indicating an apparent fiber attenuation coefficient a of only 0.12 dB/km.

In accordance with the principles of invention, OTDR 115 is modified to employ a so-called "out-of-band" offsetting for canceling the effects of Raman non-linearities. Likewise, losses and faults in the optical fibers are monitored by measuring the back-scattered portion of the light launched into the fiber. Although the test is performed on optical fiber 105 carrying the traffic signals to ensure reliable fault coverage, the test signal back-scattering is judiciously offset to account for Raman non-linearities which extract energy from the traffic signal wavelengths and amplify the test signal back-scattering. In this latter manner, the effects of the Raman non-linearities are substantially minimized, if not entirely canceled. That is, the effect of the Raman non-linearities is taken as a baseline measurement and, then accordingly used as the basis to offset the test signal back-scattering, as described more fully herein below.

This so-called "out-of-band" offsetting is accomplished by first measuring the "out-of-band" back-scattering received at the OTDR without the presence of a test signal, but while there is still live traffic. This "out-of-band" or baseline back-scattering is observed as an offset above the normal receiver noise. This "out-of-band" back-scattering is then used as the basis to offset the test signal back-scattering. Preferably, this baseline measurement is made immediately before measuring the test signal back-scattering to account for power fluctuations in the traffic. More specifically, just prior to launching test light pulse(s) 135, OTDR 115 is modified to first measure the "out-of-band" back-scattering due to Raman non-linearities, that is the amount of back-scattering reaching the ODTR that occurs at the test signal wavelength due to stimulated Raman scattering. This "out-of-band" back-scattering is measured by pulse generator 125 generating a "blank" test pulse, and then measuring the backward-scattering occurring at the test signal wavelength, for example, at 1.65 $\mu$m. In this latter manner, only the back-scattering due to the spontaneous Raman scattering is measured.

Referring back to FIG. 1, the "out-of-band" back-scattering is coupled to a photo-detector 165, such as a p-i-n diode or avalanche photo-diode (APD), through a directional coupler 170 whereby the "out-of-band" back-scattering is converted to an electrical signal. Although directional coupler 170 is preferably a 3 dB fusion type fiber coupler, beam splitters, circulators, prisms or optical switches may also be used to perform the same function. The electrical signal is amplified by an amplifier 175, converted into a digital signal using an analog-to-digital converter (ADC) 180, and then processed by signal processor 130 to compute the amount of "out-of-band" back-scattering (dB) occurring at the test signal wavelength. Again, because the back-scattered signal is weak, the measurement is averaged over several minutes to detect the "out-of-band" back-scattering from the receiver noise.

Once the "out-of-band" or baseline back-scattering has been measured, OTDR 115 then launches short duration test light pulse(s) 135 (~20 dBm) into optical fiber 105, and measures as a function of time (distance) the test signal back-scattering. These test light pulses 135 are coupled to transmission fiber 105 through WDM coupler 140, which also serve to likewise direct the test signal back-scattering to photodetector 165. To prevent the test pulses, however, from saturating photodetector 165, sufficient optical isolation is provided between laser diode 120 and photo-detector 165. Also to ensure nonintrusive testing, the test signal pulse(s) 135 is removed from the traffic signals prior to reaching a transmission receiver 185 by inserting, for example, a 1550 nm bandpass filter 190 to block the test signal wavelength. If desired, the test-signal back-scattering may be displayed on a monitor 195.

Recall, that as each light pulse 135 propagates along optical fiber 105, it encounters reflecting and scattering sites resulting in a portion of the launched signal being reflected back along in the opposite direction. As discussed herein above, this back-scattering, however, is the sum of the back-scattering due to Rayleigh scattering and possibly Fresnel reflection, which has been amplified due to the Raman gain, G. Similarly, the test signal back-scattering is converted to an electrical signal, and then digitized.

Importantly, signal processing unit 130, however, takes the previously measured "out-of-band" or baseline back-scattering to calculate the Raman gain, G, present over the length of the fiber, and then use the gain as the basis to accordingly offset the test signal back-scattering. It can be shown that the amount of "out-of-band" back-scattering PBS produced in a fiber of length L by Raman non-linearities for a traffic of average power $P_o$ is approximately given by:

$$P_{BS} \approx P_O \alpha_{Raman} \alpha_{Rayliegh} S \int_{z=0}^{L} e^{-2\alpha z} e^{2\gamma' z} dz \qquad (4)$$

$$\frac{P_{BS}}{P_O} \approx \alpha_{Raman} \alpha_{Rayliegh} \frac{S\left(1 - e^{-2(\alpha - \gamma')L}\right)}{2(\alpha - \gamma')} \qquad (5)$$

$$\frac{P_{BS}}{P_O} \approx \alpha_{Raman} \alpha_{Rayliegh} \frac{S\left(1 - e^{-2(\alpha - \gamma')L}\right)}{2(\alpha - \gamma')} \qquad (6)$$

where $\alpha_{Raman}$ is the Raman scattering coefficient, $\alpha_{Rayleigh}$ is Rayleigh scattering coefficient, S is the back-scattering capture coefficient, and z is the distance along the fiber, with the fiber attenuation $\alpha$ assumed to be approximately the same for the test and traffic wavelengths.

In accordance with the principles of invention, using Eq. (6), the effective Raman gain coefficient $\gamma'$ can be determined from the measured "out-of-band" back-scattering $P_{BS}$, and $P_o$. Typically, $P_o$ is a system parameter, and hence a known value. However, if the traffic power is unknown, another "blank" test pulse may be used to measure the amount of back-scattering $P_s$ reaching the ODTR that occurs at the traffic signal wavelength due to the Rayleigh scattering. Note that this requires coupling the back-scattering occurring at the traffic signal wavelength to photodetector 165, such as through the use of a circulator 200. This latter back-scattering then can be used to calculate the traffic power $P_O$ in accordance with following relationship:

$$P_O \approx P_S \frac{2\alpha}{\alpha_{Rayleigh} S \left(1 - e^{-2\alpha L}\right)} \qquad (7)$$

where $P_s$ is the back-scattering reaching the ODTR that occurs at the traffic signal wavelength.

Once the Raman gain coefficient $\gamma'$ has been determined, it can then be inserted into Eq. (1) to yield the Raman gain G, which in turn is used as the basis to offset the test signal back-scattering, thereby canceling the effects of the Raman non-linearities. Those skilled in the art will readily note that since the Raman gain coefficient $\gamma'$ in Eq. (6) cannot be expressed in closed form with respect to the "out-of-band" back-scattering PBS, the Raman gain coefficient $\gamma'$ must be calculated using numeric iteration techniques.

The above Raman gain G calculation can be illustrated by way of example under the following conditions with respect to the ODTR traces shown in FIG. 4: traffic power of 0.1 W (20 dBm) at 1550 nm, test signal wavelength at 1.65 µm, attenuation coefficient α of 0.2 dB/km, fiber length of 50 km, Raman gain factor of $0.27 \times 10^{-13}$ m/W, backscatter factor of 0.001, and spontaneous Raman efficiency of $1 \times 10^{-6}$. Employing a "blank" test pulse from pulse generator 125, as discussed herein above, the "out-of-band" back-scattering PBS occurring at 1.65 µm is measured. Of course, OTDRs employing a different test wavelength may likewise obtain the "out-of-band" back-scattering occurring at the chosen test signal wavelength. For a measured normalized "out-of-band" back-scattering ($P_{BS}/P_o$) of −92 dB or −72 dBm, the effective Raman gain coefficient γ' is calculated using numerical iteration to be 0.18 1/km. Using Eq. (1), the Raman gain G over the 50 km is then calculated as 4 dB. Inasmuch as OTDR trace 155 is the true test signal back-scattering, but amplified due to the Raman gain, adjusting or depressing each data point along OTDR trace 155 by the Raman gain G (dB) divided by the corresponding distance z along the fiber 105 yields OTDR trace 160. In other words, the test signal back-scattering corresponding to a distance z along the fiber is offset by the Raman gain, G, divided z. Hence, this "out-of-band" offsetting cancels the effects of the Raman non-linearities, greatly improving the accuracy of the OTDR by restoring the back-scattered signal back to its true reading.

Note that the above offsetting procedure may be used in combination with remote testing to ensure the integrity of optical fibers in a network. During network installation, a baseline OTDR measurement for each fiber can be created and saved in a database. As the networks are upgraded to the use of dense wavelength division multiplexing (DWDM), the above described "out-of-band" offsetting procedure can be employed to compensate for the effects of the Raman non-linearities, which cause erroneous reading in the fiber attenuation. The link loss, calculated from the compensated OTDR trace, can then be periodically compared to its reference value for preventive maintenance. If the deviation exceeds a given threshold level, service personnel can then be dispatched. Of course, the above "out-of-band" offsetting likewise may be used to offset the test signal back-scattering corresponding to splices, cracks, and bends in the fiber.

It should be understood that the embodiments herein above are merely illustrative of the principles of the invention. Various modifications may be made by those skilled in the art which will embody the principles of the invention and fall within the spirit and the scope thereof.

What is claimed is:

1. An optical time-domain reflectometer having a light source means for launching a test light pulse into a test fiber carrying traffic signals, and means for measuring, as a function of time after the launching of the test light pulse, the test signal back-scatter from the test fiber, wherein the improvement comprises said means for measuring including means for offsetting the test signal back-scatter so as to compensate for Raman non-linearities present in the test fiber which Raman non-linearities extract energy from the traffic signals and amplify the test signal back-scatter, wherein the offsetting of the test signal back-scatter is made on the basis of the Raman gain G present over the length of the test fiber, and the Raman gain G is calculated from a measured "out-of-band" back-scattering PBS in accordance with the following equations:

$$G = e^{\gamma' L}$$

$$\frac{P_{BS}}{P_o} \approx \alpha_{Raman} \alpha_{Rayliegh} \frac{S(1 - e^{-2(\alpha - \gamma')L})}{2(\alpha - \gamma')}$$

where $P_{BS}$ is the back-scattering reaching the optical time-domain reflectometer that occurs at the wavelength of the test light pulse without the presence of the test light pulse, but while there is still live traffic, α is the attenuation coefficient of the fiber, γ' is the effective Raman gain coefficient, $\alpha_{Raman}$ is the Raman scattering coefficient, $\alpha_{Rayleigh}$ is Rayleigh scattering coefficient, S is the back-scattering capture coefficient, $P_o$ is the average power of the traffic signals, and L is the length of the test fiber.

2. The optical time-domain reflectometer of claim 1 wherein the traffic power $P_o$ is calculated in accordance with following relationship:

$$P_O \approx P_S \frac{2\alpha}{\alpha_{Rayleigh} S (1 - e^{-2\alpha L})}$$

where $P_s$ is the back-scattering reaching the optical time-domain reflectometer that occurs at the traffic signal wavelength.

3. The optical time-domain reflectometer of claim 1 wherein said traffic signals include a plurality of dense wavelength division multiplexed optical channels.

4. The optical time-domain reflectometer of claim 1 wherein said light source means includes a laser diode, a signal processing unit, and a pulse generator which intensity modulates the laser diode upon being triggered by the signal processing unit.

5. The optical time-domain reflectometer of claim 1 wherein said means for measuring averages repeated test signal back-scattering measurements to improve the signal-to-noise ratio.

6. The optical time-domain reflectometer of claim 1 wherein said traffic signals are at wavelengths around 1550 nm and said test light pulse is at a wavelength of about 1625–1650 nm.

7. The optical time-domain reflectometer of claim 1 further including an optical coupler for coupling the test light pulse into the test fiber.

8. The optical time-domain reflectometer of claim 1 wherein said means for measuring includes a photodetector and an optical coupler for directing the test signal backscatter to the photodetector.

9. An optical time-domain reflectometer comprising:
a light source for launching a test pulse into a fiber carrying traffic signals over a plurality of optical channels;
a pulse generator for modulating the light source;
a photodetector for detecting back-scattering of the test pulse from the fiber, or the so-called "test signal back-scattering";
a signal processing unit for triggering the pulse generator, said signal processing unit triggering the pulse generator to launch a "blank" test pulse such that the photodetector measures the "out-of-band" back-scattering PBS occurring at the wavelength of the test pulse from which the Raman gain G present over the length of the fiber is calculated, and said signal processing unit subsequently triggering the pulse generator to launch a test pulse into the fiber, with the test signal back-scattering offset on the basis of the calculated Raman gain, G.

10. The optical time-domain reflectometer of claim 9 wherein the test signal back-scattering from a corresponding distance z along the test fiber is offset by the Raman gain, G, divided by z.

11. The optical time-domain reflectometer of claim 9 wherein the Raman gain G is calculated from the test signal back-scattering PBS occurring after launching the "blank" test pulse in accordance with the following equations:

$$G = e^{\gamma' L}$$

$$\frac{P_{BS}}{P_o} \approx \alpha_{Raman} \alpha_{Rayliegh} \frac{S(1 - e^{-2(\alpha - \gamma')L})}{2(\alpha - \gamma')}$$

where $\alpha$ is the attenuation coefficient of the fiber, $\gamma'$ is the effective Raman gain coefficient, $\alpha_{Raman}$ is the Raman scattering coefficient, $\alpha_{Rayleigh}$ is Rayleigh scattering coefficient, S is the back-scattering capture coefficient, $P_o$ is the average power of the traffic signals, and L is the length of the test fiber.

12. The optical time-domain reflectometer of claim 11 wherein the traffic power $P_o$ is calculated in accordance with following relationship:

$$P_O \approx P_S \frac{2\alpha}{\alpha_{Rayleigh} S (1 - e^{-2\alpha L})}$$

where $P_s$ is the back-scattering reaching the ODTR that occurs at the traffic signal wavelength.

13. The optical time-domain reflectometer of claim 9 wherein said traffic signals include a plurality of dense wavelength division multiplexed optical channels.

14. The optical time-domain reflectometer of claim 9 wherein said light source includes a laser diode.

15. The optical time-domain reflectometer of claim 9 wherein said signal processing unit averages several test signal back-scattering measurements to improve the signal-to-noise ratio.

16. The optical time-domain reflectometer of claim 9 wherein said traffic signals are at wavelengths around 1550 nm and said test light pulse is at a wavelength of about 1625–1650 nm.

17. The optical time-domain reflectometer of claim 9 further including an optical coupler for coupling the test light pulse into the test fiber.

18. The optical time-domain reflectometer of claim 9 further including an optical coupler for directing the test signal back-scattering to the photodetector.

19. A method for measuring the optical characteristics of an optical fiber comprising the steps of:

measuring the "out-of-band" back-scattering $P_{BS}$ in the optical fiber occurring at a test wavelength from which is calculated the Raman gain C present over the length of the fiber;

launching a test light pulse at the test wavelength into the optical fiber and measuring, as a function of time after the launching of the test light pulse, the test signal back-scattering from the optical fiber; and offsetting the test signal back-scattering measured after launching the test light pulse on the basis of the calculated Raman gain, G.

20. The method of claim 19 wherein said offsetting step includes offsetting the test signal back-scattering corresponding to a distance z along the fiber by the Raman gain, G, divided z.

21. The method of claim 19 further comprising the step of calculating the Raman gain G from the out-of-band back-scattering PBS in accordance with the following equations:

$$G = e^{\gamma' L}$$

$$\frac{P_{BS}}{P_o} \approx \alpha_{Raman} \alpha_{Rayliegh} \frac{S(1 - e^{-2(\alpha - \gamma')L})}{2(\alpha - \gamma')}$$

where $\alpha$ is the attenuation coefficient of the fiber, $\gamma'$ is the effective Raman gain coefficient, $\alpha_{Raman}$ is the Raman scattering coefficient, $\alpha_{Rayleigh}$ is Rayleigh scattering coefficient, S is the back-scattering capture coefficient, $P_o$ is the average power of the traffic signals, and L is the length of the test fiber.

22. The method of claim 21 wherein the traffic power $P_o$ is calculated in accordance with following relationship:

$$P_O \approx P_S \frac{2\alpha}{\alpha_{Rayleigh} S (1 - e^{-2\alpha L})}$$

where $P_s$ is the back-scattering reaching the ODTR that occurs at the traffic signal wavelength.

23. The method of claim 19 wherein said optical fiber carries traffic signals over a plurality of dense wavelength division multiplexed optical channels.

24. The method of claim 19 further including the step of averaging test signal back-scattering measurements to improve the signal-to-noise ratio.

* * * * *